United States Patent
Waclawik et al.

(10) Patent No.: US 10,297,133 B2
(45) Date of Patent: May 21, 2019

(54) MAIL DELIVERY WIRELESS NOTIFICATION SYSTEM

(71) Applicants: Bart Waclawik, Carmel, IN (US); Elizabeth Waclawik, Carmel, IN (US)

(72) Inventors: Bart Waclawik, Carmel, IN (US); Elizabeth Waclawik, Carmel, IN (US)

(*) Notice: Subject to any disclaimer, the term of this patent is extended or adjusted under 35 U.S.C. 154(b) by 0 days.

(21) Appl. No.: 16/015,679

(22) Filed: Jun. 22, 2018

(65) Prior Publication Data
US 2018/0374332 A1 Dec. 27, 2018

Related U.S. Application Data

(60) Provisional application No. 62/523,518, filed on Jun. 22, 2017.

(51) Int. Cl.
*A47G 29/12* (2006.01)
*A47G 29/14* (2006.01)
*H04W 88/02* (2009.01)
*G08B 21/18* (2006.01)
*H04L 29/08* (2006.01)

(52) U.S. Cl.
CPC .......... *G08B 21/18* (2013.01); *A47G 29/1209* (2013.01); *A47G 29/1214* (2013.01); *A47G 29/141* (2013.01); *H04L 67/10* (2013.01); *H04W 88/02* (2013.01)

(58) Field of Classification Search
CPC .............. A47G 29/1214; A47G 29/141; A47G 29/121; A47G 29/1209; A47G 29/14; A47G 29/12; A47G 29/1245; G06Q 10/083; G06Q 10/08; G06Q 10/0832; G06Q 10/0836
See application file for complete search history.

(56) References Cited

U.S. PATENT DOCUMENTS

| | | | | |
|---|---|---|---|---|
| 4,836,352 A * | 6/1989 | Tateno | ............... | G07F 17/12 177/25.15 |
| 4,868,543 A * | 9/1989 | Binkley | ............ | A47G 29/1214 340/569 |
| 5,475,378 A * | 12/1995 | Kaarsoo | ............... | A47G 29/141 235/382 |
| 5,818,336 A * | 10/1998 | Varga | ................. | A47G 29/1207 340/545.1 |
| 6,788,203 B1 * | 9/2004 | Roxbury | ............ | A47G 29/1214 232/35 |
| 7,486,948 B1 * | 2/2009 | Vergon | ............... | A47G 29/1214 379/88.12 |
| 7,786,862 B1 * | 8/2010 | Campbell | .......... | A47G 29/1214 340/539.1 |
| 7,896,226 B1 * | 3/2011 | Branan | ............. | A47G 29/1209 232/45 |
| 9,554,646 B1 * | 1/2017 | Charette | ............... | E05B 65/00 |

(Continued)

*Primary Examiner* — Hoi C Lau
(74) *Attorney, Agent, or Firm* — Woodard, Emhardt, Henry, Reeves & Wagner, LLP

(57) ABSTRACT

Among other things, there is disclosed a system for notifying a user of mailbox activity. A transmitter module and a receiver module are linked together so that when the transmitter module senses the opening of the mailbox, a signal is transmitted to the receiver module. A portion of the receiver module changes color and a sound is emitted to indicate mailbox activity. The receiver module is connected via the internet to a cloud server, which is connected to a user's smart device, so that a notification of mailbox activity is sent to the smart device.

11 Claims, 19 Drawing Sheets

(56) References Cited

U.S. PATENT DOCUMENTS

| | | | | |
|---|---|---|---|---|
| 10,016,083 B1* | 7/2018 | Atieh | | A47G 29/1214 |
| 2002/0109985 A1* | 8/2002 | Voacolo | | A47G 29/1209 |
| | | | | 362/154 |
| 2003/0085631 A1* | 5/2003 | Cech | | A47G 29/1214 |
| | | | | 310/319 |
| 2003/0132279 A1* | 7/2003 | Stemmle | | A47G 29/12 |
| | | | | 232/31 |
| 2003/0152480 A1* | 8/2003 | Sham | | A61L 2/202 |
| | | | | 422/28 |
| 2004/0190756 A1* | 9/2004 | Kim | | G07C 9/00563 |
| | | | | 382/115 |
| 2005/0068181 A1* | 3/2005 | Wang | | G07C 9/00103 |
| | | | | 340/572.1 |
| 2005/0154602 A1* | 7/2005 | Hertz | | G06Q 10/08 |
| | | | | 345/540 |
| 2009/0084836 A1* | 4/2009 | Dudley | | A47G 29/1209 |
| | | | | 232/34 |
| 2009/0119232 A1* | 5/2009 | Mercier | | G07B 17/00193 |
| | | | | 705/407 |
| 2011/0084124 A1* | 4/2011 | Curtis | | A47G 29/121 |
| | | | | 232/34 |
| 2012/0062362 A1* | 3/2012 | Rudduck | | G06Q 10/083 |
| | | | | 340/5.64 |
| 2012/0235786 A1* | 9/2012 | Rudduck | | G06Q 10/083 |
| | | | | 340/5.54 |
| 2013/0335231 A1* | 12/2013 | Caldwell | | G06Q 10/08 |
| | | | | 340/691.6 |
| 2014/0346221 A1* | 11/2014 | Pendergast | | A47G 29/12 |
| | | | | 232/34 |
| 2015/0186840 A1* | 7/2015 | Torres | | A47B 81/00 |
| | | | | 705/339 |
| 2015/0359372 A1* | 12/2015 | Cho | | A47G 29/1245 |
| | | | | 232/18 |
| 2015/0371468 A1* | 12/2015 | Mackin | | G06Q 10/0836 |
| | | | | 340/5.26 |
| 2016/0230421 A1* | 8/2016 | Cochran | | E05B 43/005 |
| 2016/0235236 A1* | 8/2016 | Byers | | A47G 29/14 |
| 2016/0278558 A1* | 9/2016 | Ansari | | H04W 4/12 |
| 2016/0300187 A1* | 10/2016 | Kashi | | G06Q 10/0836 |
| 2016/0353911 A1* | 12/2016 | Ziemianski | | A47G 29/1214 |
| 2016/0374494 A1* | 12/2016 | Geng | | A47G 29/141 |
| | | | | 232/17 |
| 2017/0164773 A1* | 6/2017 | Wirtz | | A47G 29/1214 |
| 2017/0286905 A1* | 10/2017 | Richardson | | G06Q 10/0832 |
| 2017/0295979 A1* | 10/2017 | Appell | | A47G 29/1214 |
| 2017/0352122 A1* | 12/2017 | Markarian | | B07C 3/14 |
| 2018/0012476 A1* | 1/2018 | Haynes | | A47G 29/1214 |
| 2018/0197140 A1* | 7/2018 | Goja | | A47G 29/141 |

\* cited by examiner

The server receives the device data and the server sends data to the device.
Protocol: TCP/IP.
The data transfer: The APP establishes a "Socket" connection with the server, and then transfers data through a stable connection.
Diagram:
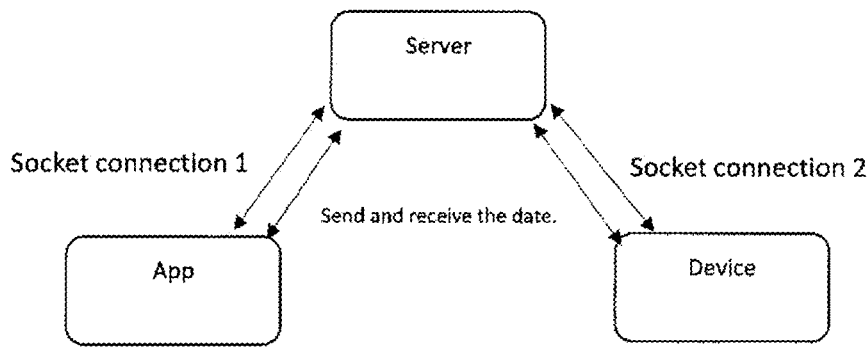
Socket connection 1
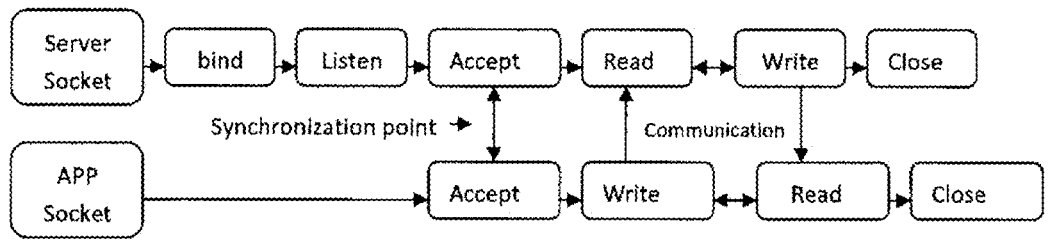
Socket connection 2
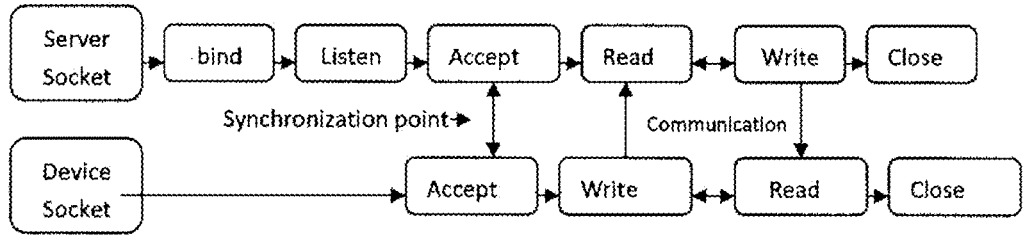
FIG. 10

MAIL DELIVERY WIRELESS NOTIFICATION SYSTEM

FIELD OF THE INVENTION

The present invention generally relates to a mail notification system. More specifically the present invention is an alert system designed for a conventional postal mailbox that can notify a user when mail has been delivered via visual, audible, and/or push notification on the user's smart device.

BACKGROUND OF THE INVENTION

People often look for ways to make daily tasks more convenient. Despite the increase use of digital communication, conventional mail is still one of the most common ways to transport goods and physical mail. While tracking numbers and other means of notification are available, postal services are not able to provide an instant notification when mail or goods have been deposited into the postal mailbox, particularly when the mailbox is at some distance from the residence or business, or when the person(s) receiving mail at the mailbox are not present.

An electronic mail (e-mail) system notifies a user when an electronic message is received or sent. With traditional (paper) mail, however, this option is not available. Each postal service has a set mail route with approximate times when a mail carrier is expected to be at a certain location. The mail recipient, however, is not notified when the mail or small packages are placed into the mailbox. Consequently, the mail recipient does not know exactly when the mail has been delivered, which often results in unnecessary trips to the mailbox. Further, there is an interest in security of the mailbox when the owner is away from the mailbox or away from the house. There remains a need for a reliable and accurate system to notify a user that a mailbox has been accessed.

SUMMARY

The present disclosure aims to solve some of these problems by disclosing a notification system for mail. Upon mail delivery or other opening of the mailbox, the system is able to alert the person inside the residence or elsewhere, via an audible alert, visual alert, and/or personal electronic notification using a smart device such as a phone or tablet. For example, embodiments disclosed herein include mobile phone or other smart device integration. Consequently, the user can be notified of his or her mailbox activity as long as the smart device has an internet access regardless of the user's proximity to the mailbox.

Among other features, there is disclosed a mailbox notification system that includes a transmitter module and a receiver module. The transmitter module is adapted to be attached to a surface of a door of a mailbox, and has a sensor adapted to determine when the door has been opened. Embodiments may also include a microprocessor, a transmitter, and an antenna capable of extending outside of the mailbox, so that the transmitter module can send signals via the antenna indicating that the door has been opened. The receiver module has a first antenna adapted to receive the signals, a microprocessor, and a mail indicator capable of showing at least two colors of LED light. At least one of a USB receptacle and an SD card slot may be electronically connected to the microprocessor of the receiver module, and at least one speaker may be electronically connected to the microprocessor of the receive module. A second antenna may be provided, adapted to send a message from the receiver module via a Wi-Fi router to a cloud server. In particular embodiments, the receiver has an idle condition in which the receiver is powered and the mail indicator shows a first color of LED light, and when a signal indicating that the door has been opened is received by the receiver module, the mail indicator shows a different second color of LED light and the speaker provides a sound pre-determined by the user.

Embodiments of the system can provide that when a signal indicating that the door has been opened is received by the receiver module, the receiver sends a message via the router to the cloud server, and a smart device registered by the user to be associated with the receiver module receives a notification from the cloud server based on that message. Such a smart device may be registered with the receiver, as by inputting information from the receiver into software running on the smart device. The receiver module can be set to its reset condition using the smart device registered with the receiver in some embodiments.

The receiver module may include an enclosure having a hinged foldable stand. The receiver module can include an MP3 audio decoder electronically connected to the at least one of a USB receptacle and an SD card slot, and is also electronically connected to the speaker. In such embodiments, the receiver module may have one or more pre-programmed or built-in sounds in the audio decoder or memory associated with it, wherein the pre-programmed or built-in sounds may be played through the speaker. A selector button may be electronically connected to the microprocessor of the receiver module, with the selector button controlling whether a pre-programmed or built-in sound is the sound provided by the speaker when a signal indicating that the door has been opened is received by the receiver module. The pre-determined sound played by the receiver module may be provided via one of the at least one of a USB receptacle and an SD card slot. The mail indicator in particular embodiments is a touch screen using at least one of resistive touch or capacitive touch sensing, and when the receiver module shows the second color, touching the mail indicator resets the receiver module to the idle condition. Embodiments of the receiver module may be controllable remotely by a smart device registered with the receiver module via the internet.

These and other features are discussed in more detail below.

BRIEF DESCRIPTION OF THE DRAWINGS

FIG. 10 is a diagram of an embodiment of communication between an app, cloud server, and a user's smart device.

DETAILED DESCRIPTION OF THE ILLUSTRATED EMBODIMENTS

Figure 1:
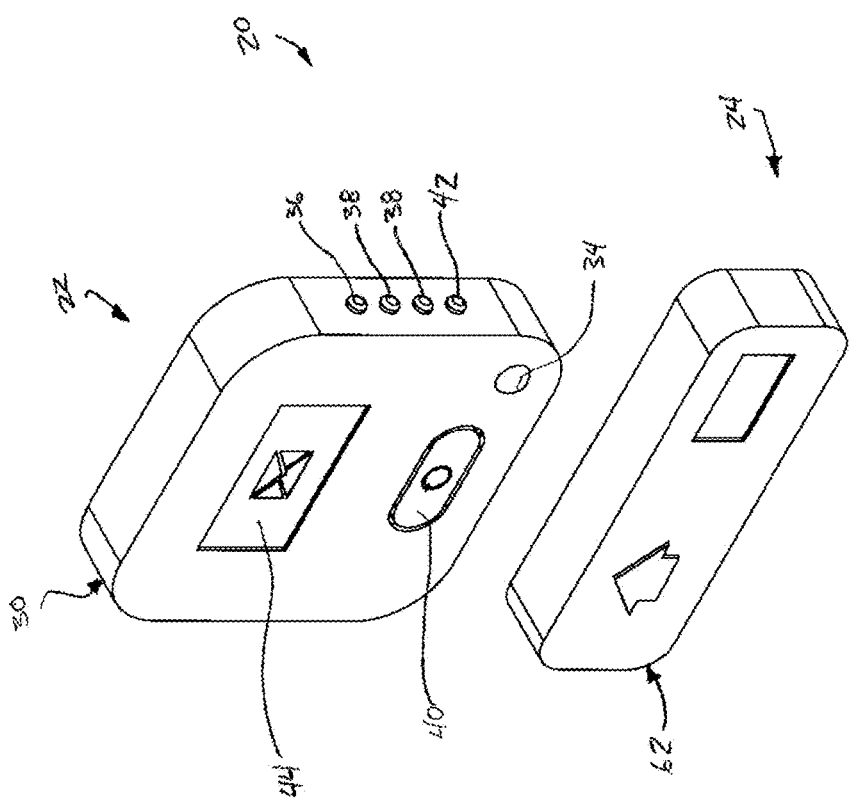
FIG. 1 is an isometric view of an embodiment of a system of the present invention.
Figure 2:
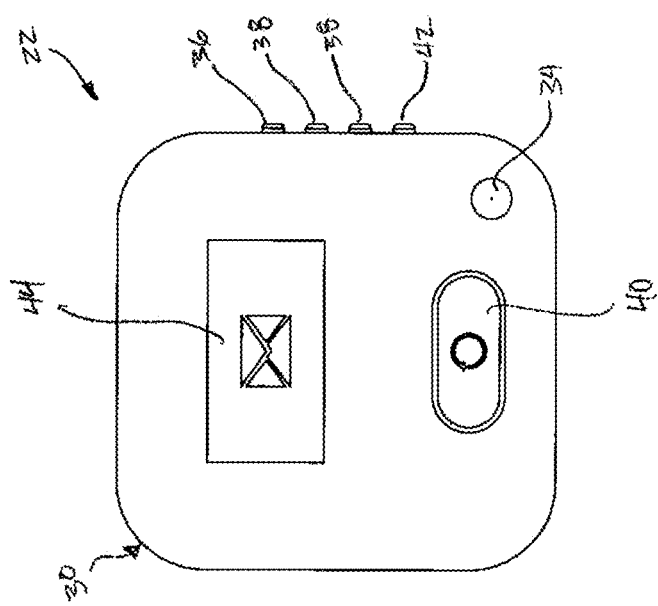
FIG. 2 is a front view of the receiver of the embodiment of FIG. 1.
Figure 3:
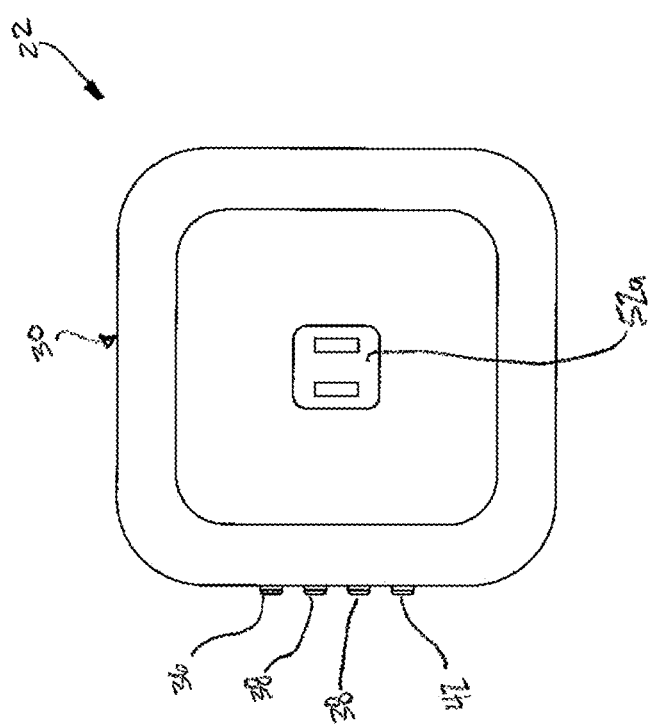
FIG. 3 is a back view of the receiver of the embodiment of FIG. 2, which shows an outlet plug.
Figure 4:
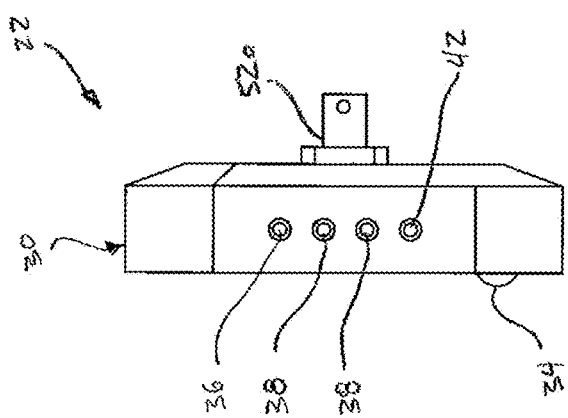
FIG. 4 is a left view of the receiver embodiment of FIG. 2, which shows a plurality of buttons.
Figure 5:
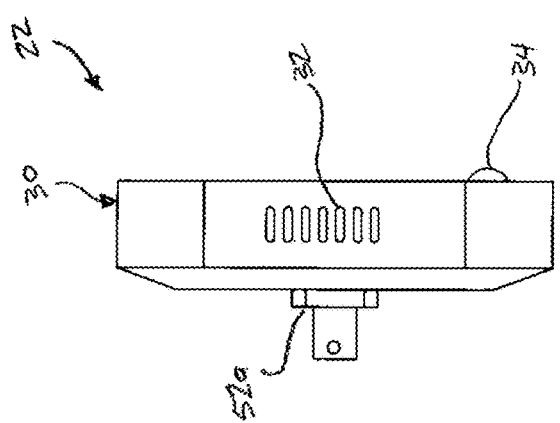
FIG. 5 is a right view of the receiver embodiment of FIG. 2.

For the purpose of promoting an understanding of the principles of the disclosure, reference will now be made to the embodiments illustrated in the drawings and specific language will be used to describe the same. It will nevertheless be understood that no limitation of the scope of the claims is thereby intended. Any alterations and further modifications in the described embodiments, and any further applications of the principles of the disclosure as described herein are contemplated as would normally occur to one skilled in the art to which the disclosure relates. All illustrations of the drawings are for the purpose of describing selected versions of the present disclosure and are not intended to limit the scope of the present claims.

Figure 14:
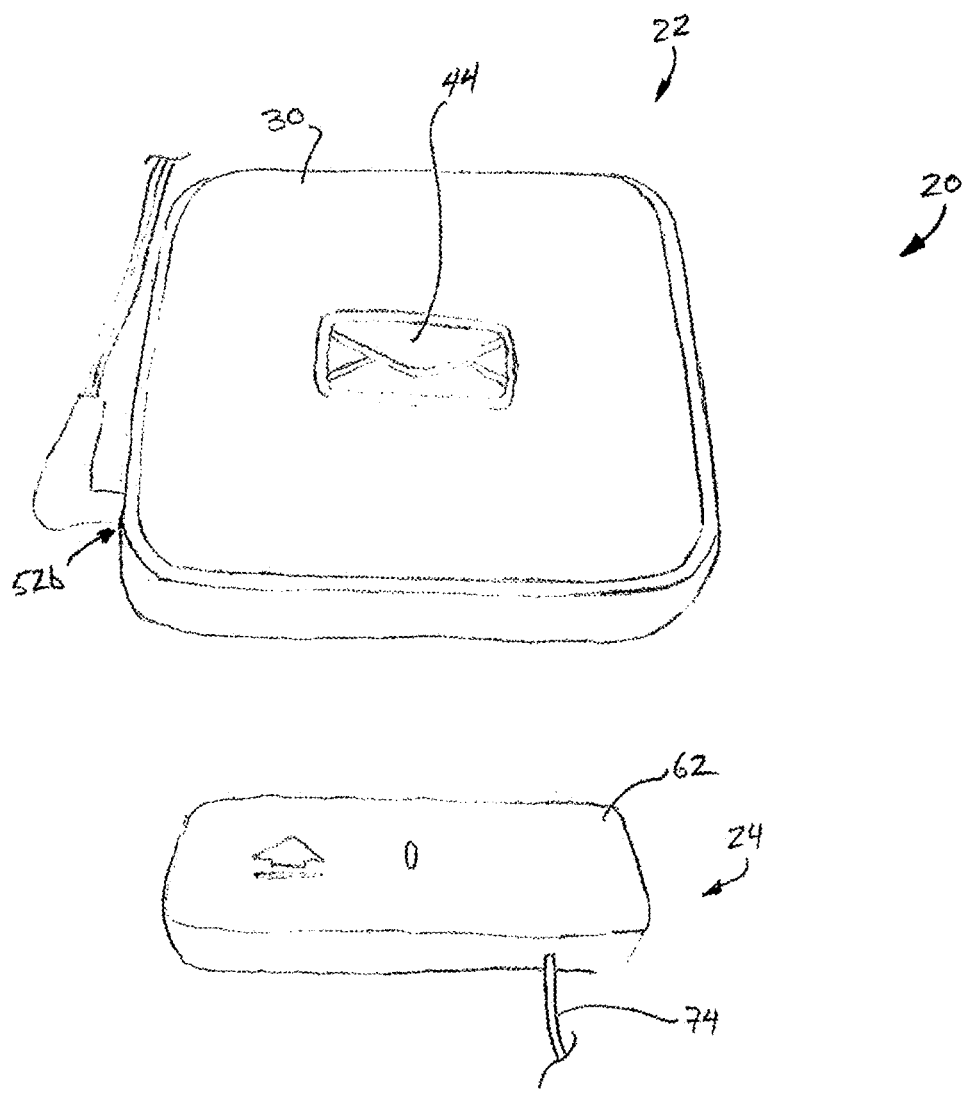
FIG. 14 is an isometric view of an embodiment of a system of the present invention (showing front and bottom surfaces, the top surface being identical to the bottom surface).

In reference to FIGS. 1 and 14, the illustrated embodiments show a wireless system 20 capable of notifying a user of mail deposited into a standard mailbox. Numerous types of alerts may be integrated into the system 20, including but not limited to one or more audible and/or visual alerts, and/or a push notification delivered via e-mail or through the user's mobile device. In particular embodiments, all three notifications are or can be used at the same time. The illustrated embodiment of system 20 includes two self-contained modules, a receiver module 22 and a switch/transmitter module 24, but it is not limited to this option.

Figure 17:
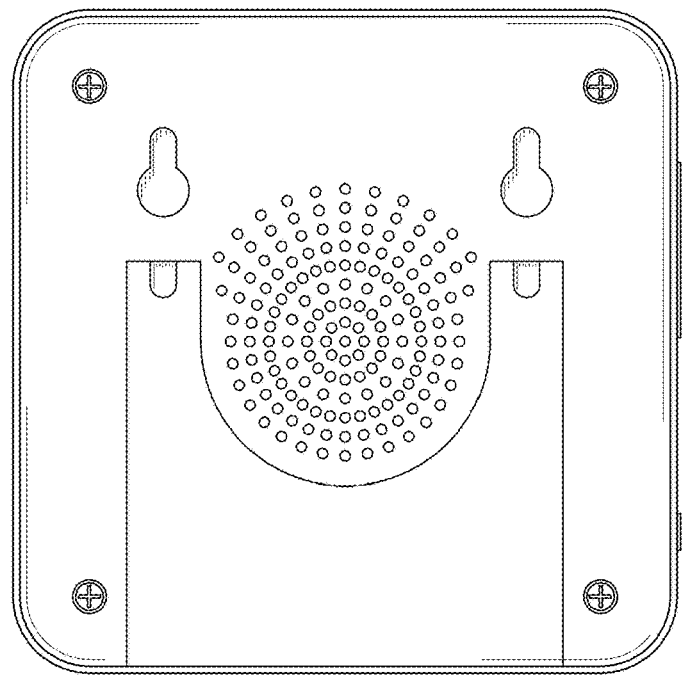
FIG. 17 is a bottom plan view of the receiver embodiment shown in FIG. 15.
Figure 18:
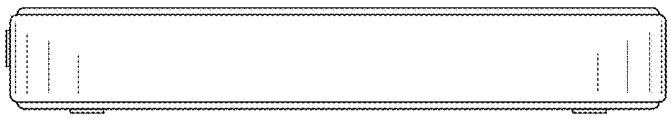
FIG. 18 is a side elevational view of the receiver embodiment shown in FIG. 16, i.e. a view from the top of FIG. 16.
Figure 19:
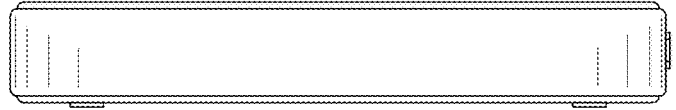
FIG. 19 is a side elevational view of the receiver embodiment shown in FIG. 16, i.e. a view from the bottom of FIG. 16.
Figure 20:
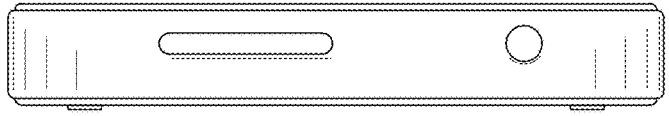
FIG. 20 is a side elevational view of the receiver embodiment shown in FIG. 16, i.e. a view from the right of FIG. 16.
Figure 21:
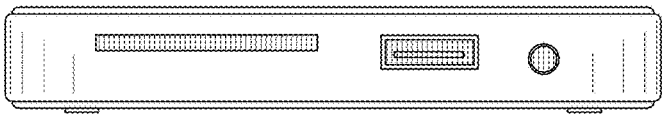
FIG. 21 is a side elevational view of the receiver embodiment shown in FIG. 16, i.e. a view from the left of FIG. 16.
Figure 22:
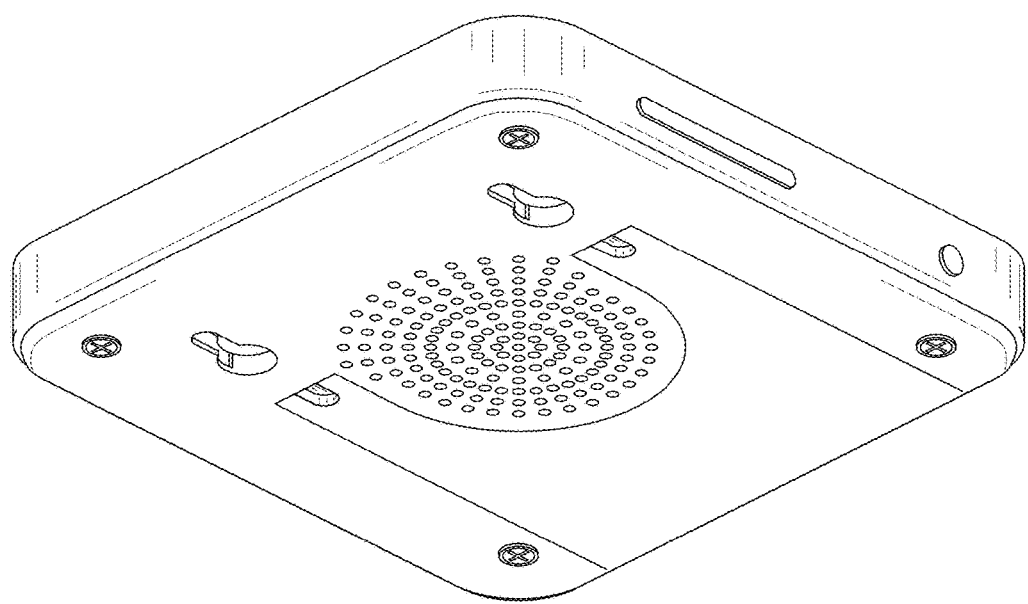
FIG. 22 is a perspective view of a receiver embodiment shown in FIG. 14 including a bottom surface.

In reference to FIGS. 2-5, receiver module 22 includes an enclosure 30, a speaker 32, a power light (e.g. LED) 34, a plurality of buttons 36, 38, 40, 42, a mail indicator light or notification icon 44, a Wi-Fi module 46, and antennas 48, 50. A microprocessor 51 (FIG. 11b, also called a microcontroller) is within enclosure 30 and electronically connected to the electronic components. Referring to FIGS. 14-17, receiver module 22 is essentially the same as module 22 shown in FIGS. 2-5 with differences or particular features described below and shown in the drawings. Enclosure 30 may be essentially rectangular with rounded corners, and in some embodiments can include features such as a hinged foldable stand S and/or grommets G for use in hanging the receiver 22 (FIG. 17). Upon receiving the signal from the transmitter 24, the receiver 22 is able to alert the user via an audible notification of the user's choice and illuminate the mail indicator light 44.

Figure 15:
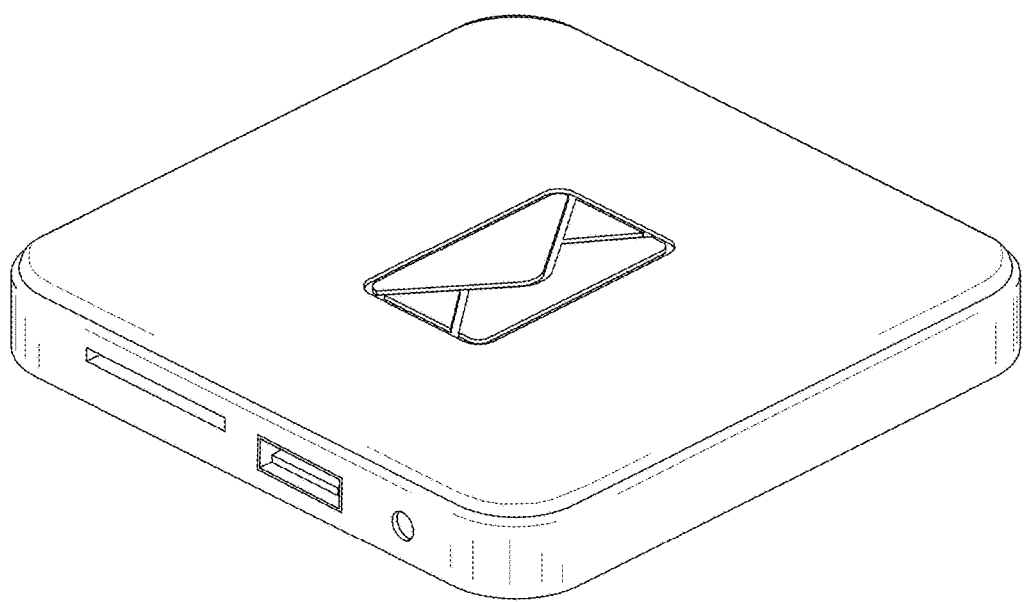
FIG. 15 is a perspective view of a receiver embodiment shown in FIG. 14 including a top surface.
Figure 16:
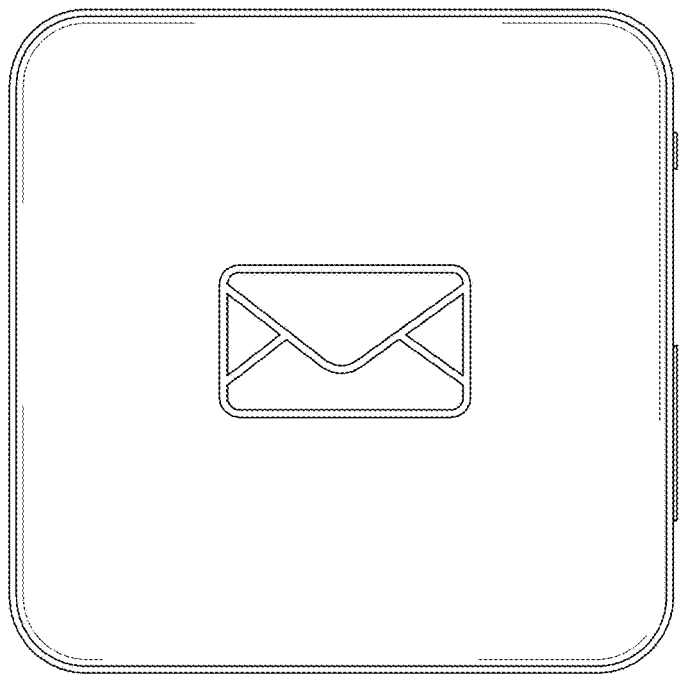
FIG. 16 is a top plan view of the receiver embodiment shown in FIG. 15.

The plurality of buttons includes an audible alert selection button(s) 36, a plurality of volume control buttons 38 (e.g. volume up, volume down and/or mute), a mail reset button 40, and additional button(s) 42 as may be required to link the receiver 22 to the user's WiFi network. The receiver is powered by an AC plug 52a (FIGS. 3-4) or a separate AC/DC power converter plugged into receptacle 52b (FIGS. 14-15). It will be understood that receiver 22 may also be powered by batteries or other power sources, such as one or more batteries, rechargeable or otherwise. Furthermore, a plurality of plugs or adapters designed for international outlets may be integrated into or provided in a kit including system 20. The power LED 34 will be on when the receiver module 22 is plugged in or otherwise powered and operational.

The selection button(s) 36 allow the user to select and save a specific ring tone or an MP3 file (e.g. a song) based on their preference. The volume of speaker 32 can be adjusted via the volume control button(s) 38, with a varying level of loudness, in one example up to 90 dB. The receiver is also provided with buttons 38 to lower or raise the volume of the alert, and a button to turn the sound alert completely off. In this embodiment, turning the sound alert off does not affect the visual alert provided by the mail indicator 44. That is, when the signal is received from the transmitter 24, as discussed above, the visual change in the indicator 44 will occur. When the sound alert is on, when the receiver 22 receives a valid signal from the transmitter 24 (e.g. mail has been placed in the mailbox), then the desired song or other alert sound will be played via the speaker(s) 32 in the receiver 22. A sound selector button 36 is used to select a preferred sound from the selection pre-programmed or built-in to the receiver. That sound selection will automatically be saved in this example. If an SD card or flash drive is installed with a preferred song or other sound (as discussed below), pressing the song selector button 36 will simply play the (or a) given file on the SD card or the flash drive in a particular embodiment.

The mail indicator light 44 includes an LCD or backlit icon display in the illustrated embodiment, but the present disclosure is not limited to this option. The LCD display 44 is positioned on the front of the receiver 22, as seen in FIGS. 2 and 14-16, and indicates whether mail has been received or the receiver 22 has been reset. A mail symbol notification, such as an envelope, may be displayed or illuminated as light or icon 44 when the mailbox is opened, as further described below. The receiver 22 further comprises a reset button 40 which allows the user to extinguish the mail notification icon 44. In some embodiments, reset button 40 is separate from the mail notification icon or LCD 44 (FIGS. 1-2), while in another embodiment (FIGS. 14-16) the reset button 40 can be a part of or integrated into the mail notification icon 44 as a press-button, or via resistive touch or capacitive touch sensing (a touch-screen). The indicator 44 includes a two-color LED in the illustrated embodiment. The envelope symbol in the illustrated embodiment of indicator 44 will light up or glow. When the receiver 22 is first turned on, the mail indicator 44 will glow in a first color (e.g. green) indicating the receiver 22 is ready. When the receiver 22 receives a valid signal from the transmitter 24 (e.g. mail has been placed in the mailbox), the indicator 44 will change from the first color to a second color (e.g. blue), and will glow. The user can touch the indicator 44 as a reset key (in the center of the envelope symbol as one example) or a separate reset key 40, to reset the receiver 22 so it is ready for the next activation.

Figure 8:
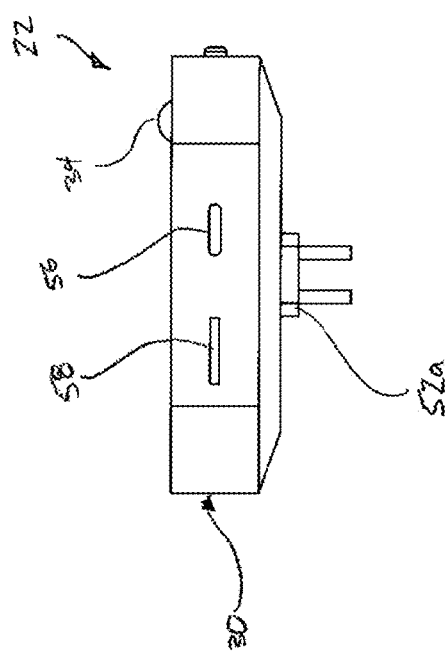
FIG. 8 is a bottom view of the receiver embodiment of FIG. 2, which shows a micro-SD slot and USB port.

FIGS. 8 and 15 show USB port or receptacle 56 and SD card slot 58 in the receiver 22. The receptacle 56 and slot 58 are used for introducing a flash drive and/or SD card with song or music (e.g. MP3) file(s) or custom audible alert(s), for the purpose of downloading such file(s) or alert(s) to the receiver 22 by the user, so as to further personalize the notification by receiver 22. These features allow the user to substitute particular song(s) or alert(s) (e.g. in MP3 format) for pre-programmed or built-in sounds, as the alert sound(s) emitted by the receiver 22. In particular embodiments, a flash drive for USB receptacle 56 is preferably a maximum of 8 GB in storage and may be kept in the receptacle 56 to use the custom sound feature. Similarly, an SD card (preferably 8 GB maximum) with MP3 song(s) or musical alert(s) may be gently inserted into the slot 58 in the receiver. In some embodiments, the SD card may remain in the slot 58 for the custom song or sound feature to function. In particular embodiments, when one of an SD card and flash drive are inserted into the receiver 22, the receiver 22 will automatically use a recorded song or alert in place of pre-programmed or built-in sounds.

Figure 11A:
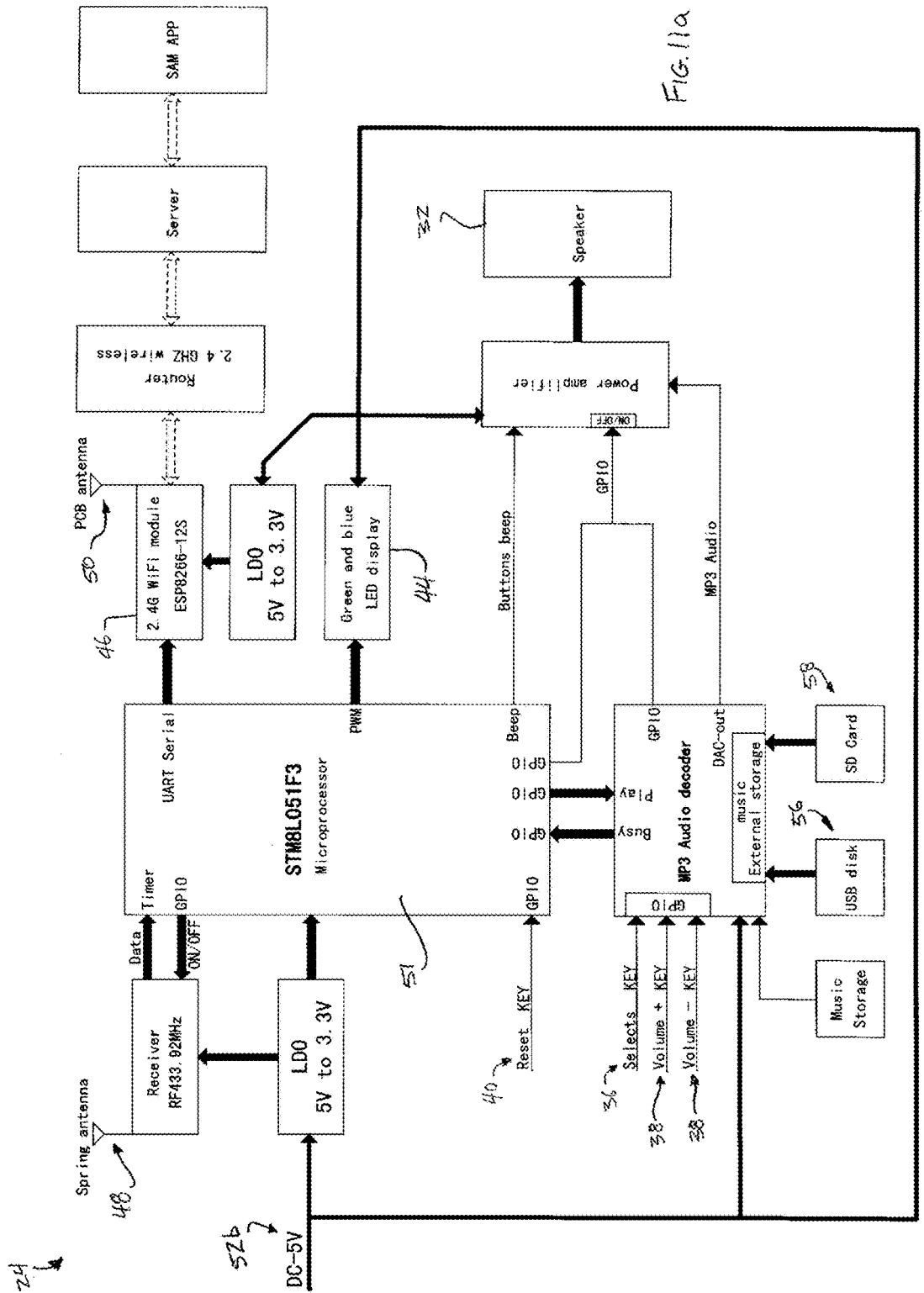
FIG. 11a and FIG. 11b are block diagrams of receiver and transmitter hardware structure, respectively, usable in the illustrated embodiments.

In reference to FIG. 11*a*, a system block diagram for the receiver module 22 is shown. The receiver 22 is controlled by a microprocessor or microcontroller 51 (e.g. running STM8L051F3 or equivalent, which is a low-power 8-bit microcontroller ("MCU")). The receiver 22 is powered by a 3.3V voltage regulator 59 (e.g. a 5V to 3.3V low-dropout regulator). The regulator 59 connects to the external 5V DC power supply 52*b*, or to plug 52*a*, perhaps via other electrical components. The receiver module 22 receives a mail trigger signal, sent from the transmitter module 24 via an external antenna 74 (e.g. wire or pigtail antenna) and received by antenna 48 of receiver module 22. The MCU 51 interfaces with the MP3 audio decoder 60 which is a module responsible for decoding MP3 audio from a USB flash drive in receptacle 56 or an SD card in slot 58. The audio decoder module 60 also has built-in sounds in particular embodiments, which are pre-programmed into module 60 (or associated memory) and can be used for alert sounds. Thus, in particular embodiments it is not necessary for the user to provide sound(s) for the receiver to operate as intended. The decoded analog MP3 audio is then sent to power amplifier 61 which powers built-in speaker 32.

The MCU 51 controls alert or notification indicator 44, which as noted above may be a dual-color (e.g. green and blue) display. When receiver 22 is in the idle or reset state the indicator 44 (or part of it) is a first color, such as solid green. When the receiver 22 receives a mail trigger signal from transmitter module 24, the MCU 51 turns the LCD display 44 (or part of it) to a second color, e.g. blue. The MCU 51 may also modulate the intensity of the second color of light via PWM (pulse width modulation) to achieve a slowly pulsating effect of the light as it dims and brightens sequentially. The display 44 is also equipped with a touch capability in particular embodiments which allows the user to touch the display 44 to reset the mail indication back to the first color and idle state, getting receiver 22 ready for the next activation event. As previously noted, a separate reset key 40 may be provided in place of the touch-capable display 44. These user inputs are shown as "Reset Key" in FIG. 11*a*.

The MCU 51 of receiver 22 communicates with the external Wi-Fi module 46 (which may be a 2.4 GHz module ESP8266-12S as a particular example). This module 46 controls the communication between receiver module 22 (using DHCP, for example) and the Wi-Fi router located in the user's home via antenna 50. The connection to the user's router may be performed via the App installed on the user's smart device. As shown in FIG. 11*a*, the router then contacts the cloud server via the socketed connection as described below.

Figure 6:
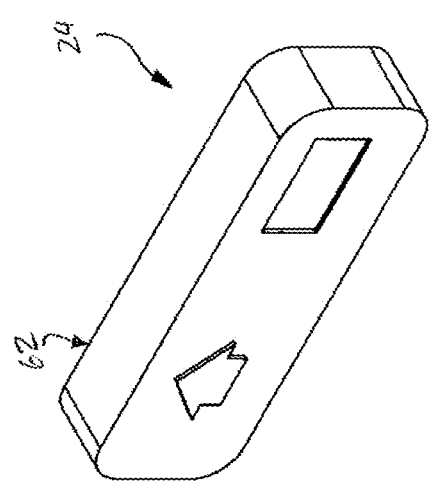
FIG. 6 is an isometric view of an embodiment of the transmitter of FIG. 1.
Figure 7:
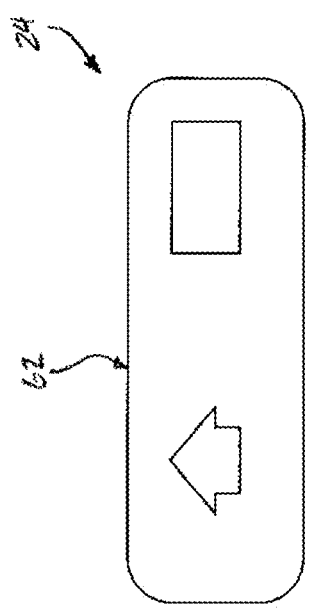
FIG. 7 is a front view of the transmitter embodiment of FIG. 6.

In reference to FIG. 6-7, the transmitter module 24 further comprises a housing 62, one or more sensors 64, a battery 70, and a transmitter unit 72, and an antenna 74 that can be housed inside of the transmitter unit 72, or project to the outside of unit 72 and/or the mailbox (i.e. a pigtail antenna with extending wire). The transmitter module 24 is positioned inside or outside of any conventional mailbox, specifically onto the mailbox door. Various attachment methods may be used to connect the transmitter 24 to the mailbox door, including but not limited to hook-and-loop attachment, adhesives, or permanent (e.g. hardware) fastening methods. The sensor 64 can sense the motion and/or tilt of the mailbox door opening, in particular embodiments, and transmitter module 24 transmits a signal to the receiver 22 indicating that the mailbox door has opened. Numerous types of sensors, such as a motion sensor and/or a tilt sensor (or angle switch), may be used, including but not limited to a mercury switch, an internal accelerometer, or a solid-state switch that would be able to detect position, orientation, tilt, and/or motion. Furthermore, the housing 62 of the transmitter module 24 may include an arrow symbol allowing the user to easily install module 24 onto the mailbox door in the correct orientation.

Figure 11B:
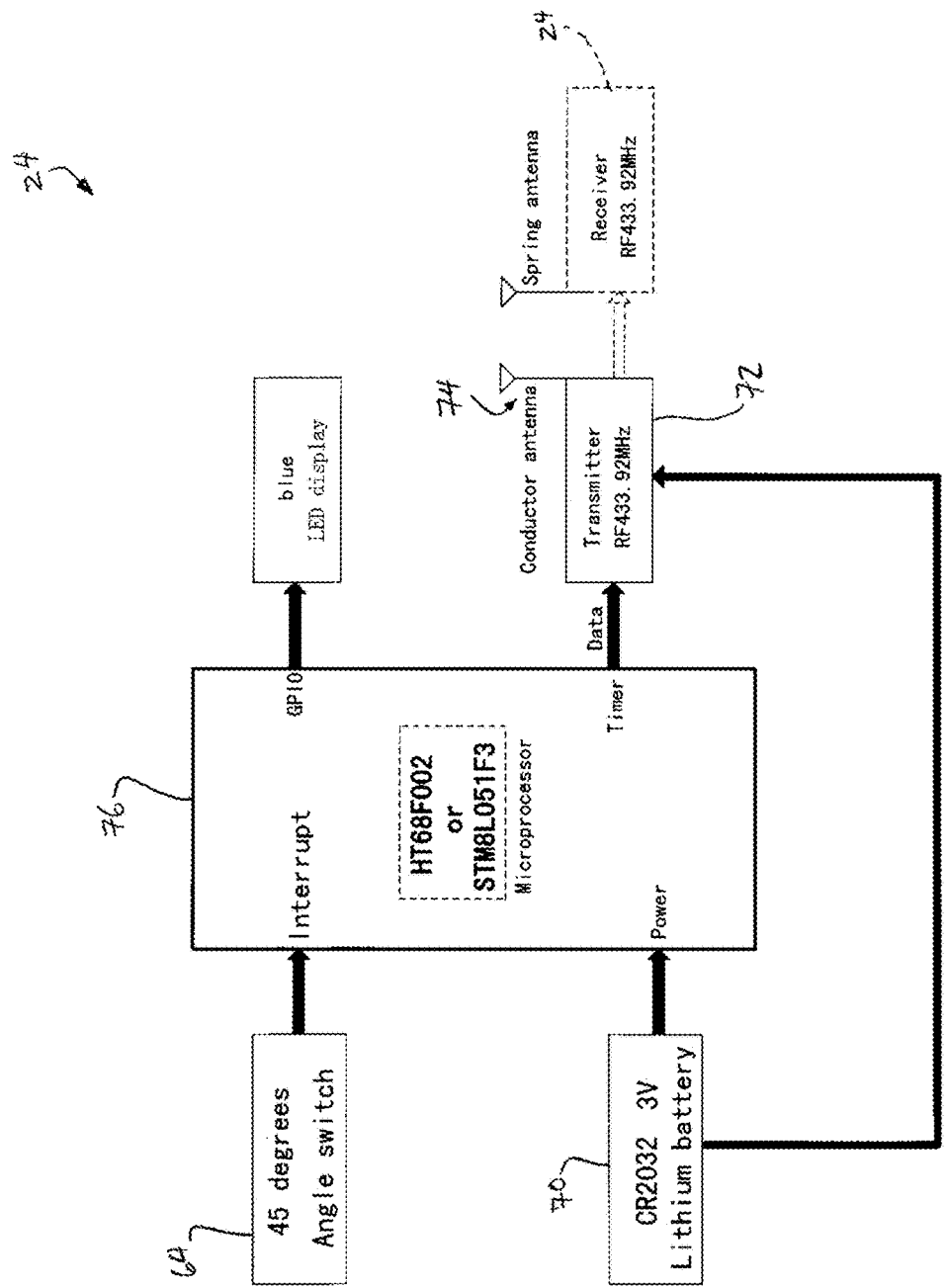

In reference to FIG. 11*b*, a system block diagram for the transmitter module 24 is shown. The module 24 includes a sensor 64 as noted above (e.g. an angle switch, such as a 45-degree angle switch) which drives a microprocessor or microcontroller 76 (such as a HT68F002 or STM8L05F3 in particular examples). The microcontroller 76 (MCU in FIG. 11*a*) in the illustrated embodiment is a low-power 8-bit device that can be interrupt-driven, which means it wakes up only when activity is detected to conserve power consumption. Microcontroller 76 is powered by battery 70, which may be a CR2032 lithium battery. When the angle switch or other sensor 64 sends the interrupt signal (indicating the opening of the mailbox door), the MCU 76 wakes up and sends a signal to the receiver 22 via unit 72 and antennas 74 and 48 (e.g. at 433.92 MHz, which is the frequency allocated by the FCC for operation of unlicensed Part 15 devices). Receiver 22 illuminates indicator 44 (e.g. a blue LED, as discussed above). Once the signal has been transmitted, the MCU 76 on the transmitter module 24 goes back into the low-power state.

The present embodiment of module 24 is designed to meet or surpass the IP53 protection (International Protection Marking, IEC standard 60529), ensuring correct operation in inclement weather conditions, such as cold and wet environments. Furthermore, it ensures proper operation in temperatures ranging from −30 degrees Celsius to over 70 degrees Celsius. The receiver 22 and transmitter 24 pairing is unique to each device, to guarantee that operation does not interfere between multiple connections in the same area. The transmitter 24 uses a regulatory-approved frequency for sending a mail trigger notification or sense command to the receiver 22.

Figure 9:
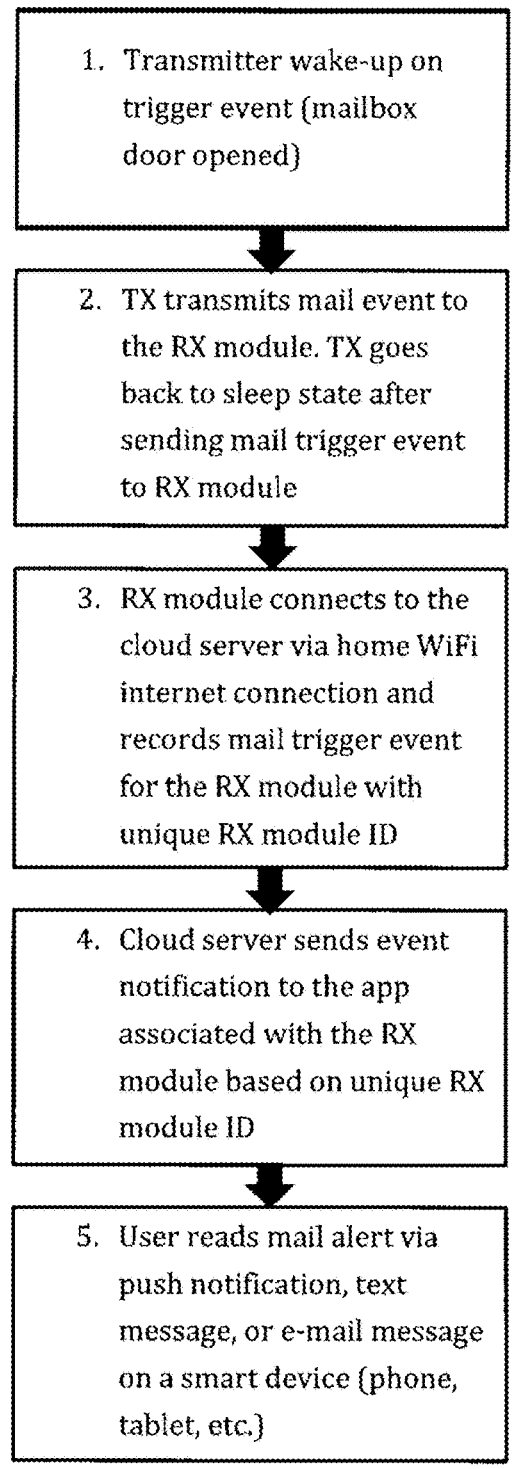
FIG. 9 is a process diagram of an embodiment of a mail trigger.

In reference to FIGS. 9-10, the receiver module 22 further integrates hardware to communicate with the user's mobile device via a software application ("App"). The user is able to download the appropriate application for his or her mobile device and register system 20 or receiver 22 with their personal information. Due to the sensitive nature of the data, the user's mobile smart device may further comprise an encryption module to ensure the information of the user is protected. In addition, the receiver 22 is able to connect to a cloud server. The cloud server receives information from the receiver module 22 (e.g. via Wi-Fi connection) and sends the notification to the App on the user's mobile smart device that has been paired with the cloud server. The user is able to configure features of system 20 concerning the mail alert, including but not limited to type or style of SMS (text) message, E-mail notification, or push notification via the App. Therefore, the user can be notified of his or her mailbox activity as long as his or her smart device has internet access, regardless of the user's proximity to the mailbox. A plurality of information may be displayed by the message or notification including date and time of mailbox opening, but the present disclosure is not limited to this option.

In reference to FIG. 10, the diagram describes the communication method between the software application installed on the user smart device (labeled "App"), the cloud server (labeled "Server"), and the receiver 22 (labeled "Device"). The Server in a particular embodiment is a cloud virtual server with a static IP address running a MySQL database, which is responsible for the data exchange between the Server, App, and the Device. Each Device (receiver 22) is assigned a unique identifier called Device ID ("DID") during manufacturing. This is an alphanumeric identifier that the cloud server uses to positively identify the receiver 22 via the internet after the bind/pairing process between receiver module 22 and the cloud server is completed by the user. Similarly, the user pairs/binds the App residing on his or her smart device with the server which will allow the server to subsequently positively identify the user's smart device and associated App via the internet.

The server receives and sends data to/from the Device (receiver 22) and the App using TCP/IP protocol in exemplary embodiments. The App establishes a network socket connection (labeled as Socket connection 1 in FIG. 10) with the cloud server, and then transfers data through the established network socket connection 1. The server also establishes a network socket connection (labeled as Socket connection 2 in FIG. 10) with the Device and sends data through that established socket connection 2. The steps in each socket connection are shown in the diagram.

Figure 12:
FIG. 12 shows the home screen of an embodiment of the app installed on a user's smart device.
Figure 13:
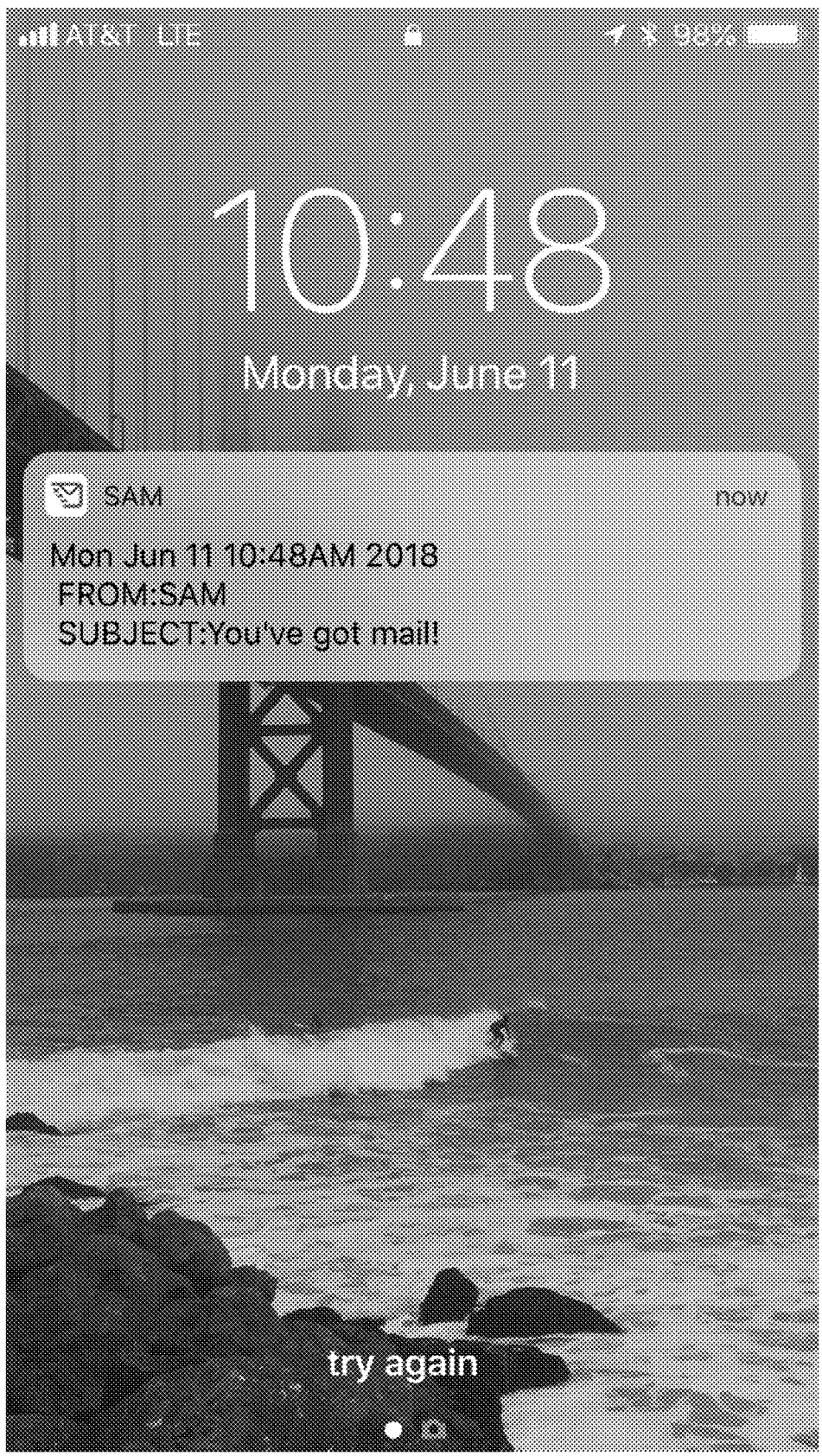
FIG. 13 shows an example of a push notification as received by a user's smart device.

FIG. 12 shows an example of the App in a HOME screen. The home screen has a log of all mailbox activity events and reset commands for a given period, such as up to 90 days. The user is able to reset the indicator light in the App as well as the indicator 44 of receiver 22 via the App (note the "Reset Mail" icon), and can go to the settings screen (note the "Settings" icon) where the user can configure additional features of the App. FIG. 13 shows an example of a push notification as viewed by the user on the smart device. As mentioned above, a message may be an SMS/text message, e-mail or other message instead of or in addition to a push notification.

In use, the user attaches the transmitter module 24 to the inside surface of the door of the mailbox. In particular embodiments the transmitter 24 (or a kit with the components of system 20) is provided with hook-and-eye (e.g. Velcro®) strips, adhesives, hardware or other devices for attaching the transmitter to the mailbox door. The transmitter should be oriented so that sensor 64 (e.g. an angle switch) within it will operate properly. As one example, an arrow on the transmitter 24 should be pointing up when the mailbox door is normally closed. The wire of or connecting the antenna 74 to transmitter module 24 and unit 72 should be routed to the outside of the mailbox for best signal range and reception, particularly for a metal mailbox. Naturally, the user should make sure that such a wire is not going to be accidentally pinched or cut by the mailbox door.

The receiver 22 is plugged in, via plug 52a or power receptacle 52b, and the user's preferred music or sound alert is entered by either using preset song selector button 36 (to choose one of the pre-programmed sounds) or by attaching an USB flash drive or SD card to receptacle 56 or slot 58 (to choose a user-defined alert song or sound). For best range of reception by the receiver 22, the receiver 22 should be placed as close to an outside wall as possible, minimizing the distance between the transmitter 24 and receiver 22. The user then verifies that the receiver 22 is receiving signal from the transmitter 24, illuminating the alert icon 44, playing the selected sound, and/or sending an alert message to the user's smart device, by opening and closing the mailbox door.

As noted, the notification of mail is also sent to a user's smart device. The receiver 22 sends a notification to the cloud server (FIGS. 9-10), which contacts the smart device via push notification, e-mail or other appropriate message. To set up the desired smart device (e.g. smart phone, tablet or similar device), the user downloads the App from a distributor (e.g. the Apple App Store or Google Play store) and installs it on his or her smart device. In particular embodiments, the user must allow the App to use Cellular Data and to send notifications in order to receive mail alerts from the receiver 22 on the smart device. Additionally, the user may allow the App and/or the receiver to access a camera on the smart device, so that a QR Code can be scanned as discussed below.

With the smart device on the same Wi-Fi network to which the receiver 22 is or will be connected, the user launches the App. The receiver 22 (or system 20) is added to the network as instructed by the App. The App also includes a menu to add the receiver 22 (or system 20) to the given Wi-Fi network via one or more linking options. The user should have "Location" permissions enabled on his or her smart device.

Scanning a QR Code on the rear surface of the receiver 22 allows the user to quickly pair the receiver with a smart device. This option should be used after the receiver 22 has been added to the user's local Wi-Fi (as noted above). One may set up remote notification on additional smart device(s) via the QR Code (with the Device ID (DID) shown with the QR Code) as well.

The App's "Search for Receiver" option allows the user to scan a local Wi-Fi network for all receiver(s) 22 which are configured on the user's local Wi-Fi. This option can be used, for example, if a receiver 22 was previously added to a Wi-Fi network (as noted above) but was either deleted accidentally in the App, or the user wants to add additional receiver(s) 22 to his or her App. This option (accessible by pressing the appropriate icon in the App) will search the Wi-Fi (e.g. a home Wi-Fi) for a receiver 22 and allow its addition to the App. One can add multiple receivers 22 to the App, and swipe left/right on the App to switch between the receivers 22 added to/recognized by the App.

Once the receiver(s) 22 have been successfully connected to the Wi-Fi network, the user verifies the connection. For example, the user can go to the Settings page on the App to see whether "Receiver to Wi-Fi Connection Status" and "Receiver to Cloud Connection Status" are both acceptable (e.g. green). The user can verify that notifications are being received on the desired smart device(s) by opening the mailbox. The "mail" symbol in the App may turn color as an alert, or in addition to another message (push notification, e-mail, etc.) indicating mail receipt. The mail indicator (in the App and indicator 44 of receiver 22) can be reset within the App by pressing a Reset Mail icon in the App. The "mail" symbol on the App will change color (e.g. to green), as will the mail indicator 44 on the receiver 22. In the illustrated embodiment, the App has a built-in delay (e.g. 10 seconds, 30 seconds, or 1 minute) to prevent multiple alerts from being sent for a single mail activation event (e.g. opening and closing the mailbox). Therefore, one will only receive a single notification for multiple triggering events within the given time interval in such embodiments.

In preferred embodiments, the receiver module 22 and transmitter module 24 are paired (e.g. electronically connected) at the factory. Pairing must be conducted by the user in cases of using a different transmitter 24 or receiver 22 different from the original matched pair. To pair a transmitter 24 and receiver 22, ensure they are in close proximity and that the receiver 22 and the user's smart device are both connected to the same Wi-Fi. Next, press the Pairing button on the App on the smart device, and then activate the transmitter 24 by shaking or turning it and observing the transmitter LED turn on. A confirmation message will appear on the App indicating that pairing has been completed.

While the disclosure has been illustrated and described in detail in the drawings and foregoing description, the same is to be considered as illustrative and not restrictive in character, it being understood that only preferred embodiments have been shown and described and that all changes, equivalents, and modifications that come within the spirit of the subject matters defined by the following claims are desired to be protected. It will further be understood that structures or other features described with respect to one particular embodiment or item may be used in connection or along with other features, items or embodiments included herein. All publications, patents, and patent applications cited in this specification are herein incorporated by reference as if each individual publication, patent, or patent application were specifically and individually indicated to be incorporated by reference and set forth in its entirety herein.

What is claimed is:

1. A mailbox notification system, comprising:
a transmitter module adapted to be attached to a surface of a door of a mailbox, the transmitter module having a sensor adapted to determine when the door has been opened, a microprocessor, a transmitter, and an antenna capable of extending outside of the mailbox, wherein the transmitter module can send signals via the antenna indicating that the door has been opened;
a receiver module having a first antenna adapted to receive the signals, a microprocessor, a mail indicator capable of showing at least two colors of LED light, at least one of a USB receptacle and an SD card slot electronically connected to the microprocessor of the receiver module, at least one speaker electronically connected to the microprocessor of the receive module, and a second antenna adapted to send a message from the receiver module via a Wi-Fi router to a cloud server,
wherein the receiver has an idle condition in which the receiver is powered and the mail indicator shows a first color of LED light, and when a signal indicating that the door has been opened is received by the receiver module, the mail indicator shows a different second color of LED light and the speaker provides a sound pre-determined by the user.

2. The system of claim 1, wherein when a signal indicating that the door has been opened is received by the receiver module, the receiver sends a message via the router to the cloud server, and a smart device registered by the user to be associated with the receiver module receives a notification from the cloud server based on that message.

3. The system of claim 2, wherein the smart device is registered with the receiver by inputting information from the receiver into software running on the smart device.

4. The system of claim 3, wherein the receiver module can be set to its reset condition using the smart device registered with the receiver.

5. The system of claim 1 wherein the receiver module includes an enclosure having a hinged foldable stand.

6. The system of claim 1, wherein the receiver module includes an MP3 audio decoder electronically connected to the at least one of a USB receptacle and an SD card slot, and is also electronically connected to the speaker.

7. The system of claim 6, wherein the receiver module includes one or more pre-programmed or built-in sounds in the audio decoder or memory associated with it, wherein the pre-programmed or built-in sounds may be played through the speaker.

8. The system of claim 7, wherein the receiver module includes a selector button electronically connected to the microprocessor of the receiver module, wherein the selector button controls whether a pre-programmed or built-in sound is the sound provided by the speaker when a signal indicating that the door has been opened is received by the receiver module.

9. The system of claim 8, wherein the pre-determined sound is provided via one of the at least one of a USB receptacle and an SD card slot.

10. The system of claim 1, wherein the mail indicator is a touch screen using at least one of resistive touch or capacitive touch sensing, and when the receiver module shows the second color, touching the mail indicator resets the receiver module to the idle condition.

11. The system of claim 1, wherein the receiver module is controllable remotely by a smart device registered with the receiver module via the internet.

* * * * *